United States Patent [19]
Takahashi

[11] Patent Number: 5,185,682
[45] Date of Patent: Feb. 9, 1993

[54] RECORDING AND/OR REPRODUCING APPARATUS

[75] Inventor: Hirokazu Takahashi, Kanagawa, Japan

[73] Assignee: Canon Kabushiki Kaisha, Tokyo, Japan

[21] Appl. No.: 841,884

[22] Filed: Feb. 25, 1992

Related U.S. Application Data

[63] Continuation of Ser. No. 708,001, May 23, 1991, which is a continuation of Ser. No. 190,596, May 5, 1988, abandoned.

[30] Foreign Application Priority Data

May 15, 1987 [JP] Japan .............................. 62-119301
May 16, 1987 [JP] Japan .............................. 62-119796

[51] Int. Cl.⁵ ............................................ G11B 21/10
[52] U.S. Cl. .................................. 360/78.04; 360/60; 360/68; 360/78.11
[58] Field of Search ...................... 360/8, 78.04, 78.11

[56] References Cited

U.S. PATENT DOCUMENTS 4,772,962  9/1988  Tanaka et al. .................... 360/72.2

Primary Examiner—Vincent P. Canney
Attorney, Agent, or Firm—Robin, Blecker, Daley & Driscoll

[57] ABSTRACT

There is disclosed a reproducing apparatus for reproducing a series of audio signal units which have been divided from an audio signal and recorded on a plurality of areas on a recording medium, while they are compressed on time base and overlapped with each other, with an overlapping portion having a predetermined time, in which the reproducing is effected by storing every one of the divided audio signal units into a memory, reading out the audio signal units from the memory, while applying time base conversion by effecting writing operation and reading out operation at different speeds, and reproducing a succeeding audio signal from the recording medium and storing the same into the memory when a remaining amount of the audio signal which has not been read out from the memory reached an amount which is equal to or less than a predetermined amount larger than said overlapping portion, during reading out the audio signal from the memory.

12 Claims, 11 Drawing Sheets (REPRODUCING)

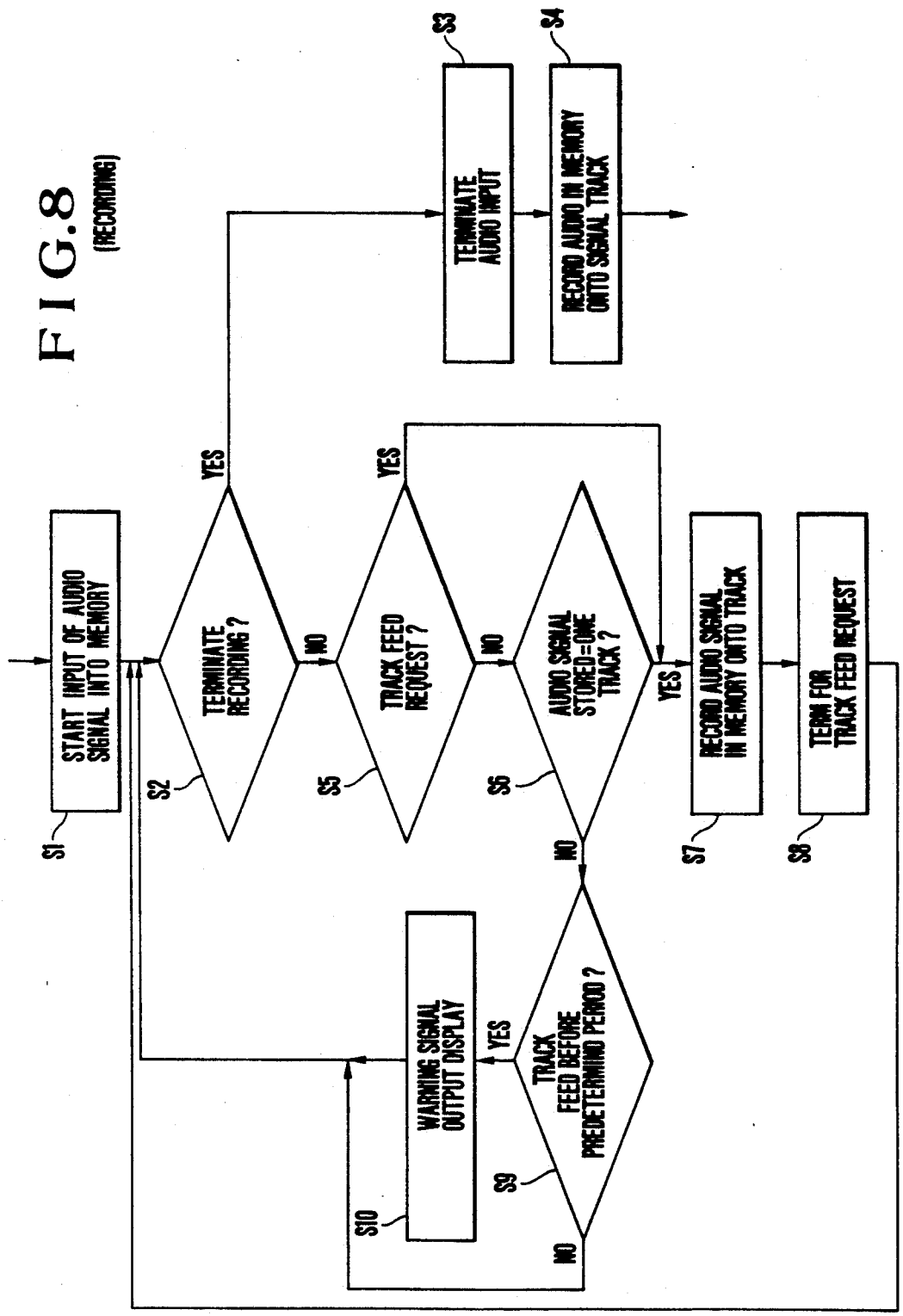
FIG. 8 (RECORDING)

RECORDING AND/OR REPRODUCING APPARATUS

This is a continuation of application Ser. No. 708,001, filed May 23, 1991, which is a continuation of Ser. No. 190,596, filed on May 5, 1988, now abandoned.

BACKGROUND OF THE INVENTION

1. Field of the Invention and/or reproducing apparatus for recording and/or reproducing an image signal and an audio signal.

2. Description of the Related Art

Heretofore, a video tape recorder (generally referred to as VTR) and other recording and/or reproducing apparatuses have been known for recording and/or reproducing an image signal as well as an audio signal. Recently, a still video system for recording a still image signal and an audio signal on a video floppy has been developed and a general standard therefore has been published.

According to a record format for recording a still image signal and an audio signal on a video floppy under such general standard for the still video system, one field of a still image can be recorded on one track of a video floppy and an audio signal can be recorded, while it is compressed on time-base at a compression rate of 320, 640 or 1280, with recording times of about five seconds or ten seconds.

The audio signal can be recorded over a plurality of recording tracks and, when the audio signal exceeds the maximum that can be recorded on one audio signal track, it can be displaced from one track to a next track at any time, in other words, it can be displaced even from a middle point of the one track to the next.

However, problems arise in the recording and/or reproducing apparatus as described above. That is, in the apparatus of this kind, it is required to hold corresponding relation between a still image signal and an audio signal, so that it is necessary to make one still image correspond to one audio signal track, but at the time of recording an audio signal and at the time of reproducing said audio signal there exists a slight difference therebetween in timing of displaying a corresponding still image, with the result that an audio signal which has been continuously recorded may become discontinuous, depending upon the timing of changeover of a corresponding image signal at the time of recording, so that a noise or other undesirable effect may be caused thereby.

Furthermore, if a still image is changed over at any desired time, a remaining portion of a track on which an audio signal has been recorded remains unused at every time of effecting the changeover operation and, consequently, a recording time of an audio signal on a video floppy as a whole is considerably reduced, resulting in undesirable waste of recording capacity of the video floppy.

SUMMARY OF THE INVENTION

In view of the problems as described above it is a first object of the present invention to provide a recording apparatus in which an information signal is recorded as a plurality of divided sections, which can be reproduced in favorable manner to reproduce the information signal, without causing discontinuity therein.

It is a second object of the present invention to provide a reproducing apparatus in which an information signal recorded as a plurality of divided sections can be reproduced in favorable manner to reproduce the information signal, without causing discontinuity therein.

In view of the first and second objects as described above, it is a further object of the present invention to provide a recording and/or reproducing apparatus which is suitable for recording and/or reproducing an audio signal.

In accordance with a preferred embodiment, under such objects, there is provided a reproducing apparatus which is arranged to reproduce a series of audio signal sections, which are divided from an audio signal and recorded on a plurality of areas of a recording medium in such manner that they are compressed on time base and they overlap with each other with an overlapping portion of a predetermined time, in which sections of the divided audio signal are stored into a memory and these sections of the divided audio signal are read from the memory at a reading speed different from a writing speed, thereby effecting time-base change of the audio signal section; and when a remaining amount remaining unread in the memory becomes less than a predetermined amount larger than the above-mentioned overlapping portion during reading the memory, a next audio signal section is reproduced from the recording medium and stored into the memory.

In accordance with a further preferred embodiment of the present invention there is provided an apparatus for recording and/or reproducing an image signal and an audio signal in which the audio signal is recorded on a recording medium through a memory and a record prohibiting means is provided to prohibit recording of data stored in said memory onto the recording medium when the audio signal data stored in said memory is less than a predetermined amount, so that the recording of the data less than the predetermined amount is prohibited, whereby the audio signal which has been divided and recorded on the recording medium can be reproduced, without causing discontinuity in the reproduced audio signal.

It is another object of the present invention to provide a recording and/or reproducing apparatus in which an audio signal and an image signal are recorded on separate recording blocks of a recording medium, while these recorded signals can be combined to effect favorable reproduction.

It is a further object of the present invention to provide a reproducing apparatus in which an audio signal and an image signal recorded on separate blocks of a recording medium are reproduced by a common reproducing means, while a period during which the image signal is not reproduced is reduced to minimum.

In accordance with a preferred embodiment of the present invention, under such object, there is provided a reproducing apparatus comprising reproducing means for reproducing an audio signal which has been recorded on a recording medium by changing an access position of said reproducing means relative to the recording medium, compressing said signal on time base and dividing and recording the same on a plurality of positions on said recording medium, a memory for temporarily storing the audio signal reproduced by said reproducing means in order to change time base of the reproduced audio signal and control means for controlling timing of changing access position of said reproducing means, depending upon a result of comparison of a remaining amount, of the audio signal, which has been stored in said memory but has not yet been read out therefrom, with said plurality of positions.

The other objects and features of the present invention will be understood from the following descriptions of the embodiment of the present invention and the accompanying drawings.

BRIEF DESCRIPTION OF THE DRAWINGS

The accompanying drawings illustrate the preferred embodiments of the present invention, in which:

FIG. 8 is a flow chart illustrating the operation of the apparatus according to the present invention.

DETAILED DESCRIPTION OF THE PREFERRED EMBODIMENTS

Now, the recording and/or reproducing apparatus according to the present invention will be explained with reference to the drawings which illustrate an embodiment of the present invention according to the present invention.

Figure 1:
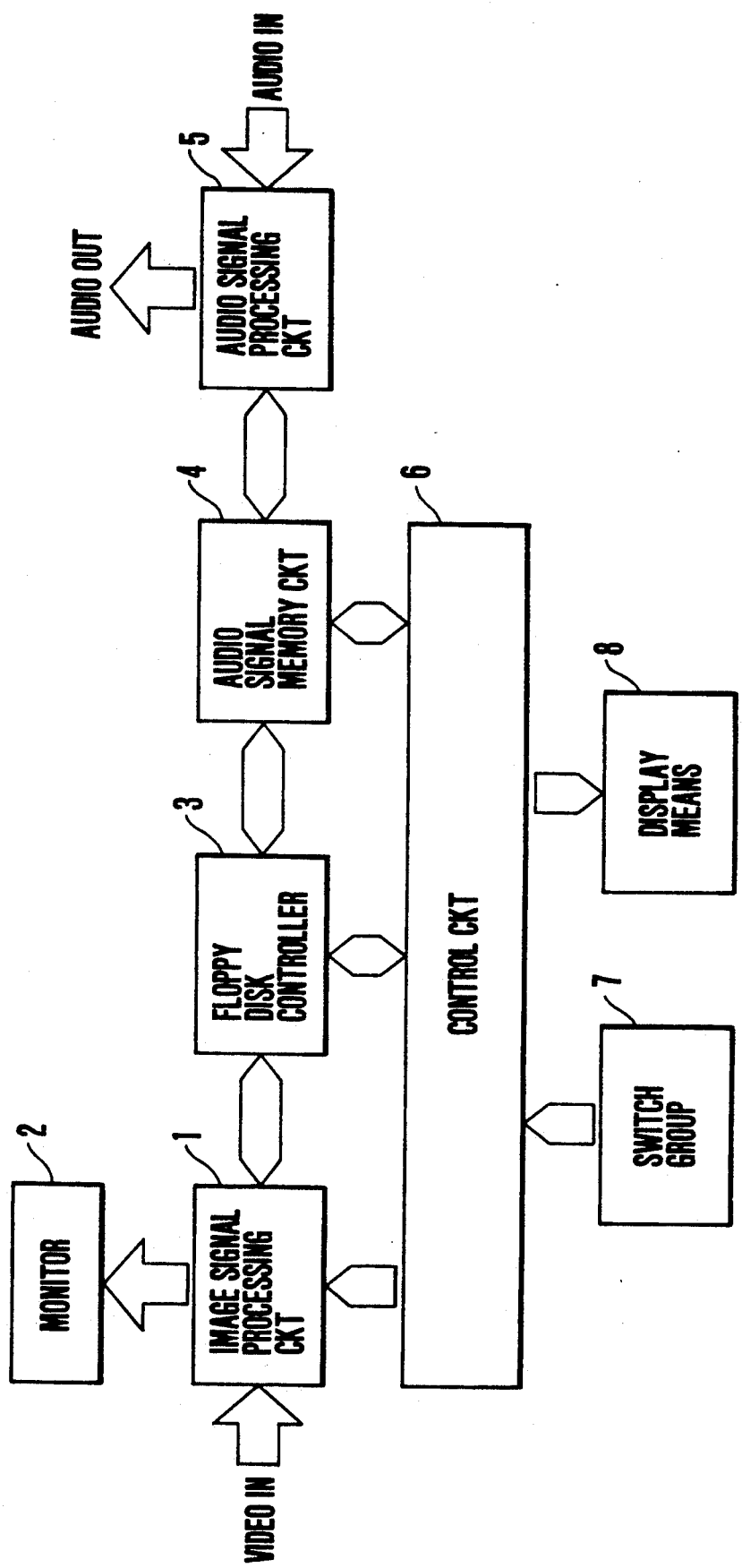
FIG. 1 is a block diagram showing the recording and/or reproducing apparatus according to the present invention.

FIG. 1 is a block diagram showing the construction of the recording and/or reproducing apparatus according to the present invention. The apparatus shown in FIG. 1 includes an image signal processing circuit 1 which operates to receive an image signal from an outside image signal source, such as a camera, and feed a signal to a monitor 2 to display an image thereon and a signal through a floppy disk controller 3 (hereinafter referred to as FDC) to a video floppy to record a still image thereon. The image signal processing circuit 1 further operates to receive a reproduced still image signal reproduced from the video floppy.

Also the apparatus includes an audio signal memory circuit 4 and an audio signal processing circuit 5 for effecting input/output of an audio signal. The audio signal memory circuit 4 operates to store the audio signal fed into the audio signal processing circuit 5, while sampling the audio signal at a time-base compression rate indicated by a control circuit 6. The audio signal memory circuit 4 further operates to feed an audio signal data, which has been reproduced from the video floppy and stored in an audio signal memory as hereinafter described, to the audio signal processing circuit 5, while extending the signal processing circuit 5, extending its time base at a time compression rate as indicated by the control circuit 6 to reproduce a sound, and it also operates to feed an audio signal through FDC 3 to the video floppy to record and reproduce the audio signal. The apparatus further includes a group of switches 7 for feeding instructions for recording, reproducing or the like, and a display means 8 for providing a display of the mode of operation or other various displays.

Figure 2:
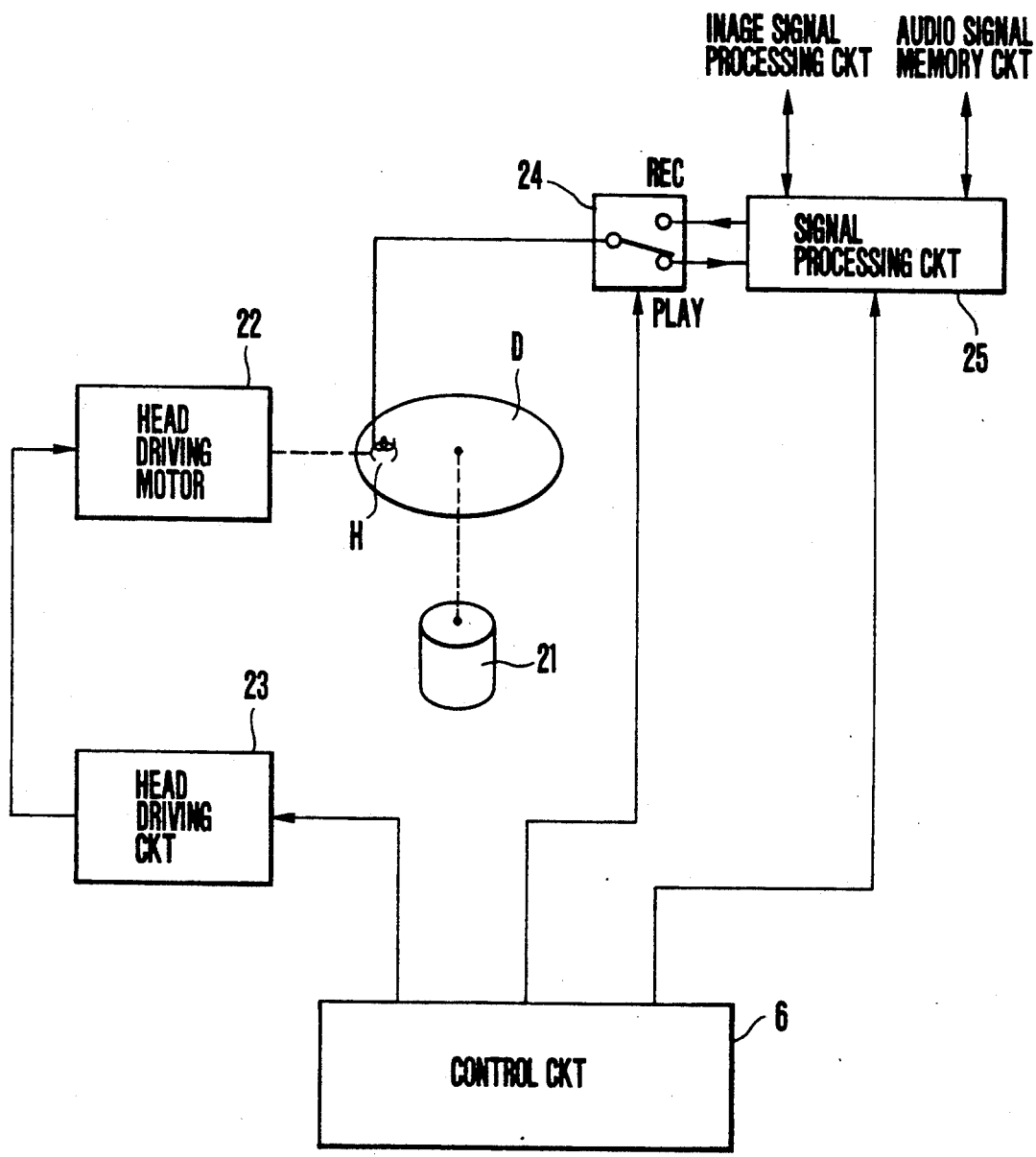
FIG. 2 is a block diagram showing an internal construction of FDC 3 shown in FIG. 1.

FIG. 2 is a block diagram illustrating an internal construction of FDC 3. In FIG. 2, the FDC includes a video floppy D which is rotated at high speed by a floppy rotating motor 21, a magnetic head H which is moved in radial direction of the video floppy D by means of a head driving motor 22, a head driving circuit 23 which controls the head driving motor 22, depending upon an instruction fed from the control circuit 6 to move the head H to a predetermined access position, a head changeover switch 24 for changing over the head H to recording position (REC) or reproducing position (PLAY) in accordance with an instruction fed from the control circuit 6, and a signal processing circuit 25 which is connected through the switch 24 to the head. The signal processing circuit 25 includes a recording circuit, a reproducing circuit, etc., and it is connected to the image signal processing circuit 1 and the audio signal memory circuit 4, to feed the signals thereto or receive the signals therefrom.

Figure 3:
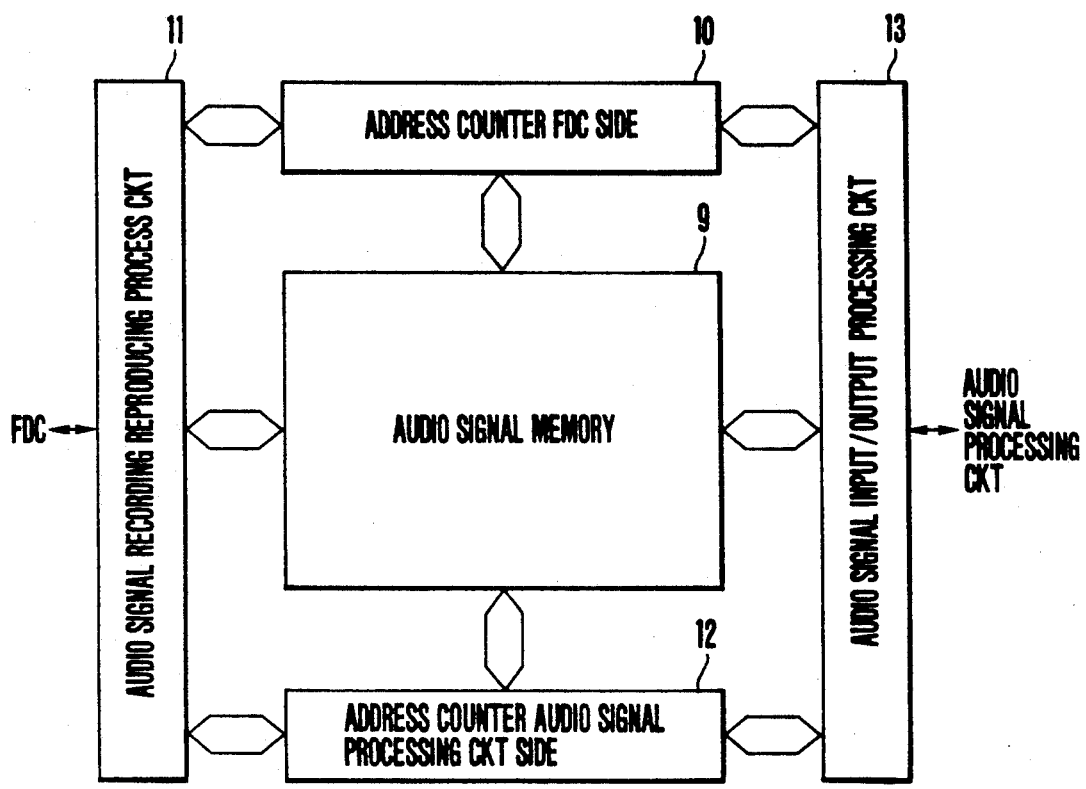
FIG. 3 is a block diagram showing a construction of an audio signal memory circuit included in the block diagram shown in FIG. 1.

FIG. 3 is a block diagram illustrating the internal construction of the audio signal memory circuit 4. The audio signal memory circuit 4 as shown in FIG. 3 includes an audio signal memory 9 for storing an audio signal, an audio signal record-reproduce processing circuit 11 for effecting control processing for recording and reproducing an audio signal through FDC 3 to or from the video floppy, an address counter 10 at the side of the FDC which is used when the audio signal record-reproduce processing circuit 11 accesses the audio signal memory 9, an address counter 12 at the side of the audio signal processing circuit which indicates an address where the audio signal data is stored on the memory 9, and an audio signal input/output processing circuit 13 for feeding or receiving signals to or from the audio signal processing circuit 5 to effect writing or reading of the audio signal into or out of the audio signal memory 9, sampling of the incoming audio signal, compressing of the signal on time-base, or other processing operations.

Figure 4:
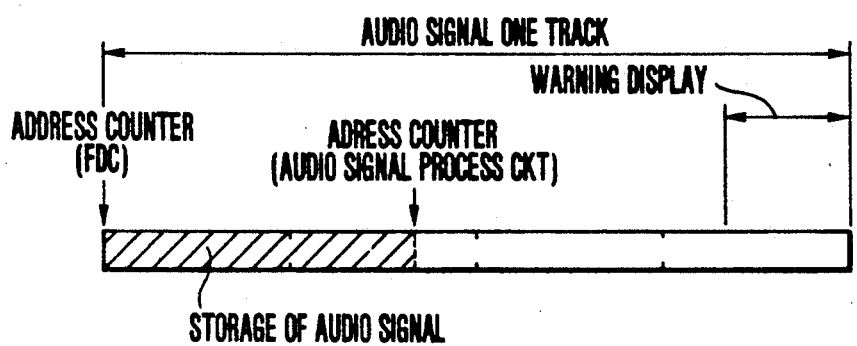
FIG. 4 is a diagram showing a manner of storing an audio signal into an audio signal memory.

Now, the writing operation of the audio signal data into the audio signal memory 9 will be explained, with reference to FIG. 4. The audio signal data, which has been fed through the audio signal processing circuit 5 into the audio signal memory circuit 4 and subjected to the sampling and time-base compressing operation, is written into the audio signal memory 9 and stored therein. Before the operation of writing the audio signal data into the audio signal memory 9 is started or immediately after the data has been recorded into the video floppy, the address counter 10 at the side of FDC and the address counter 12 at the side of the audio signal processing circuit indicate the same address on the audio signal memory. When the operation of writing the audio signal into the audio signal memory 9 is started, the address value indicated by the address counter 12 at the side of the audio signal processing circuit is counted up as the writing operation of the audio signal data proceeds. A difference between the counts of the two address counters indicates an amount of storage of the audio signal.

The audio signal recording-reproducing process circuit 11 effects controlling operation to start recording of the audio signal through FDC 3 into the video floppy at the time when the amount of storage of the audio signal as mentioned above has arrived at a maximum capacity recordable in one track of the video floppy. Then, the address counter 10 at the side of FDC counts up to the position of the recorded audio signal. This operation is repeated until an instruction for stopping the audio signal input is fed from the control circuit 6. A displacing of track can be effected at any timing during this operation. Now, the recording operation and the reproducing operation of the device according to the present invention will be explained.

Figure 5:
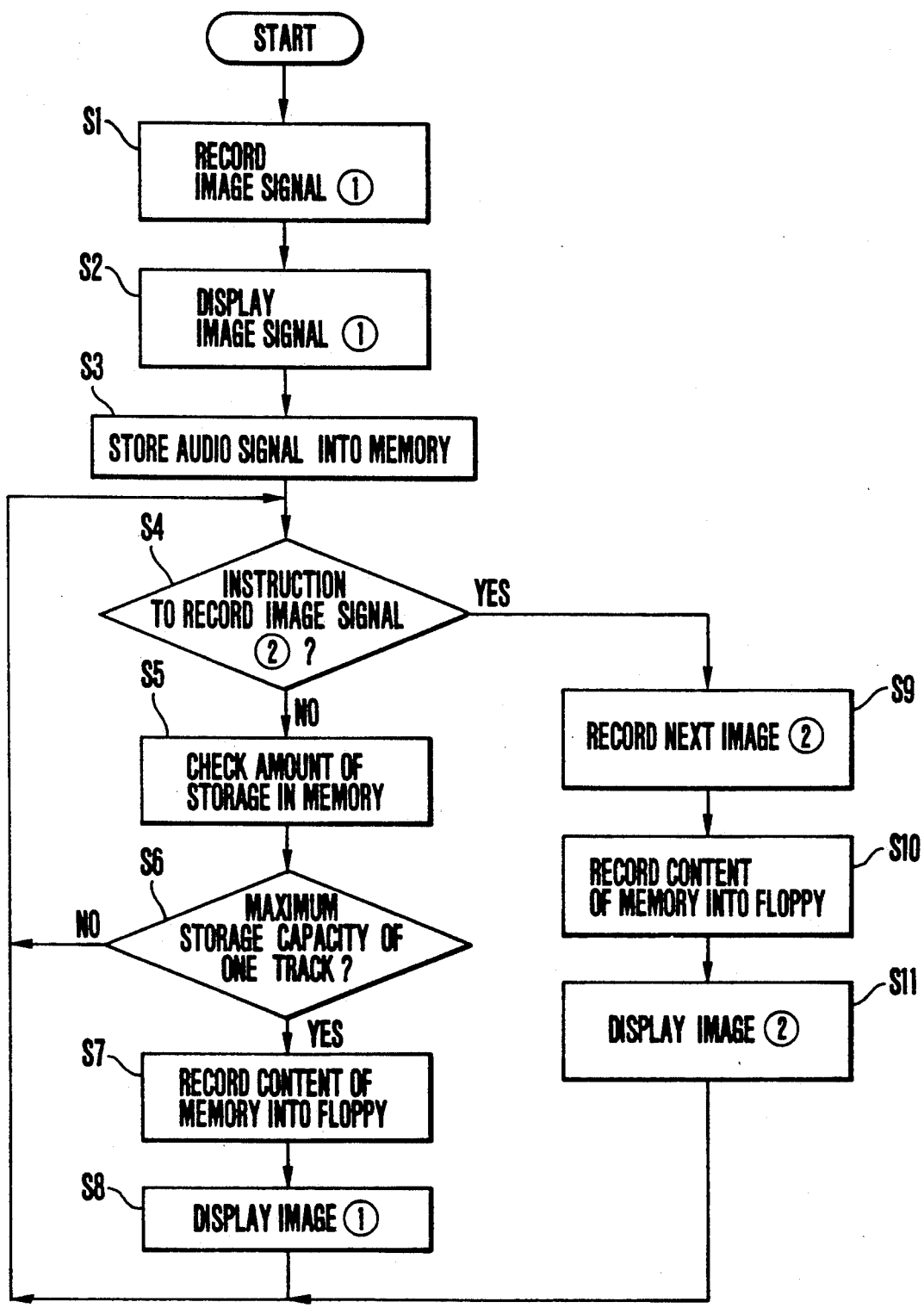
FIG. 5 is a flow chart illustrating a fundamental principle of operation at the time of recording.

FIG. 5 is a flow chart which illustrates the recording operation of the recording and/or reproducing apparatus according to the present invention.

In general, it is to be noted that a video floppy such as that used in the present invention is so constructed that a plurality of tracks for recording image signal data and a corresponding plurality of tracks for recording audio signal data are formed on the video floppy in the form of concentric circles.

When the recording operation is started, an image signal at this moment (this signal is referred to as "image signal (1)") is recorded on an image signal track (STEP 1). In the state where the head remains at the position on the track which recorded the image signal (1), the switch 24 and the signal processing circuit 25 are controlled to the PLAY side and the image signal (1) is displayed on the monitor (STEP 2). Then an audio signal incoming from an outside audio signal source is subjected to sampling and time-base compressing operation and then storing operation of said signal into the audio signal memory 9 starts (STEP 3). Thereafter, audio signals incoming from the outside source are continuously stored in the audio signal memory 9.

Then, presence or absence of an instruction for recording a next image is decided (STEP 4), and, if no instruction is present, the step proceeds to STEP 5. In STEP 5, the amount of storage of the audio signals in the audio signal memory is checked. When the amount of audio signal stored in the audio signal memory 9 reaches a maximum value of capacity which one audio signal track can record the signal presently contained in the audio signal memory 9 is recorded on the floppy (STEP 7). At this stage, no instruction is fed to the head H to record the image signal (1) again, that is, to record another image, and the step proceeds to STEP 8, where the image at this moment, that is, the image signal (1) is displayed on the monitor. The step returns to STEP 4 and the above operation is repeated.

If an instruction for recording the next image signal exists in STEP 4, the step proceeds to STEP 9, where the head is displaced to a next image signal track and an input image at this moment (this signal is referred to as "image signal (2)") is recorded. Then, the head is displaced to the audio signal track corresponding to the image signal (1). and the content which has been stored in the audio signal memory 9 to this moment, that is, the audio signal (1) corresponding to the image signal (1), is recorded on the audio signal track (1) (STEP 10).

Then, the step proceeds to STEP 11, where the head is displaced again to the position of the track on which the image signal (2) is recorded, and under the reproducing state the operation of monitoring the image signal (2) is effected.

Thereafter, the step returns to STEP 4 and the above operation is repeated.

It will be understood that the apparatus as described above effects the recording operation in such manner that every time when the next image signal is recorded, the audio signal corresponding to the preceding image signal which has been stored in the audio signal memory 9 up to this time is recorded.

Figure 6:
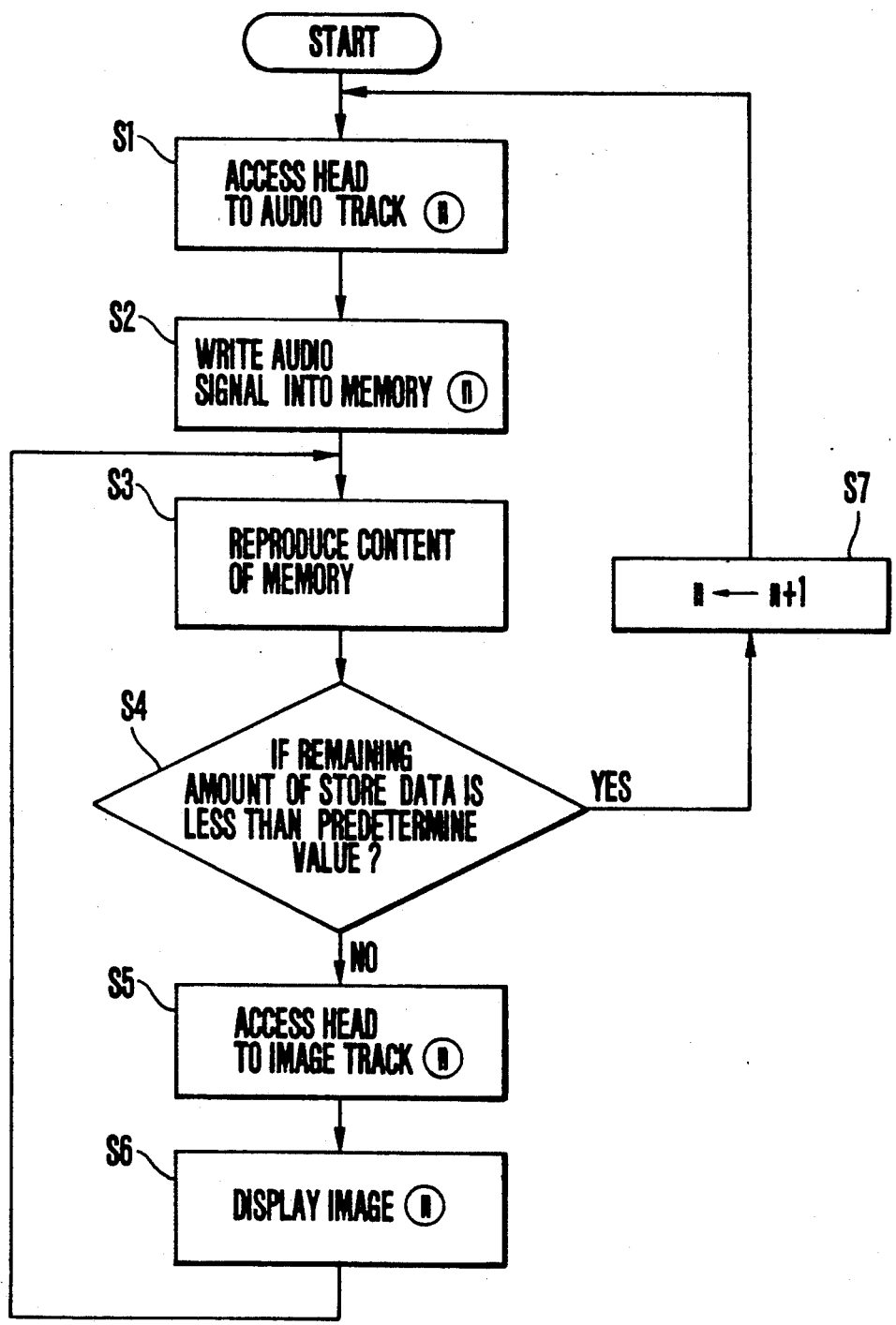
FIG. 6 is a flow chart illustrating a fundamental principle of operation at the time of reproducing.

Now the reproducing operation will be explained, with reference to the flow chart shown in FIG. 6.

The switch group 7 enables the recording and/or reproducing apparatus to reproduce the image signal of any desired image signal track. More particularly, if it is assumed that the instruction for reproducing a n-th image signal track (n) (n is an integer) is issued from the control circuit 6, then the head is moved to the position of the n-th audio signal track (STEP 1), and the content of the audio signal track (n) is written into the audio signal memory 9 (STEP 2). Then, the content of the audio signal memory 9 is fed to the audio signal processing circuit 5 and the audio signal is reproduced (STEP 3).

In STEP 4, the extent to which the content stored in the audio signal memory 9 has been read out and reproduced is inspected and it is decided whether the remaining amount of the stored data has become less than a predetermined amount or not. If the remaining amount is more than the predetermined value, the step proceeds to STEP 5 and the head is moved again to the position of the image signal track (n) corresponding to the audio signal now under reproduction. In STEP 6, the content is displayed and the step returns to STEP 3.

If the remaining amount of the audio signal memory 9 is less than the predetermined value in STEP 4, the step proceeds to STEP 7, where (+1) is added to (n) and returns to STEP 1. Thus, the reproducing operation is applied to the next image signal (n+1). In this regard it is to be noted that for the purpose of simplifying the explanation it was assumed that the image signal track under processing at present is (n) and the next image signal track is (n+1). However (+1) does not mean the amount and only means the next track to be reproduced, and practically the position of the next image signal track is written into the present audio signal track as a control code.

Figure 7:
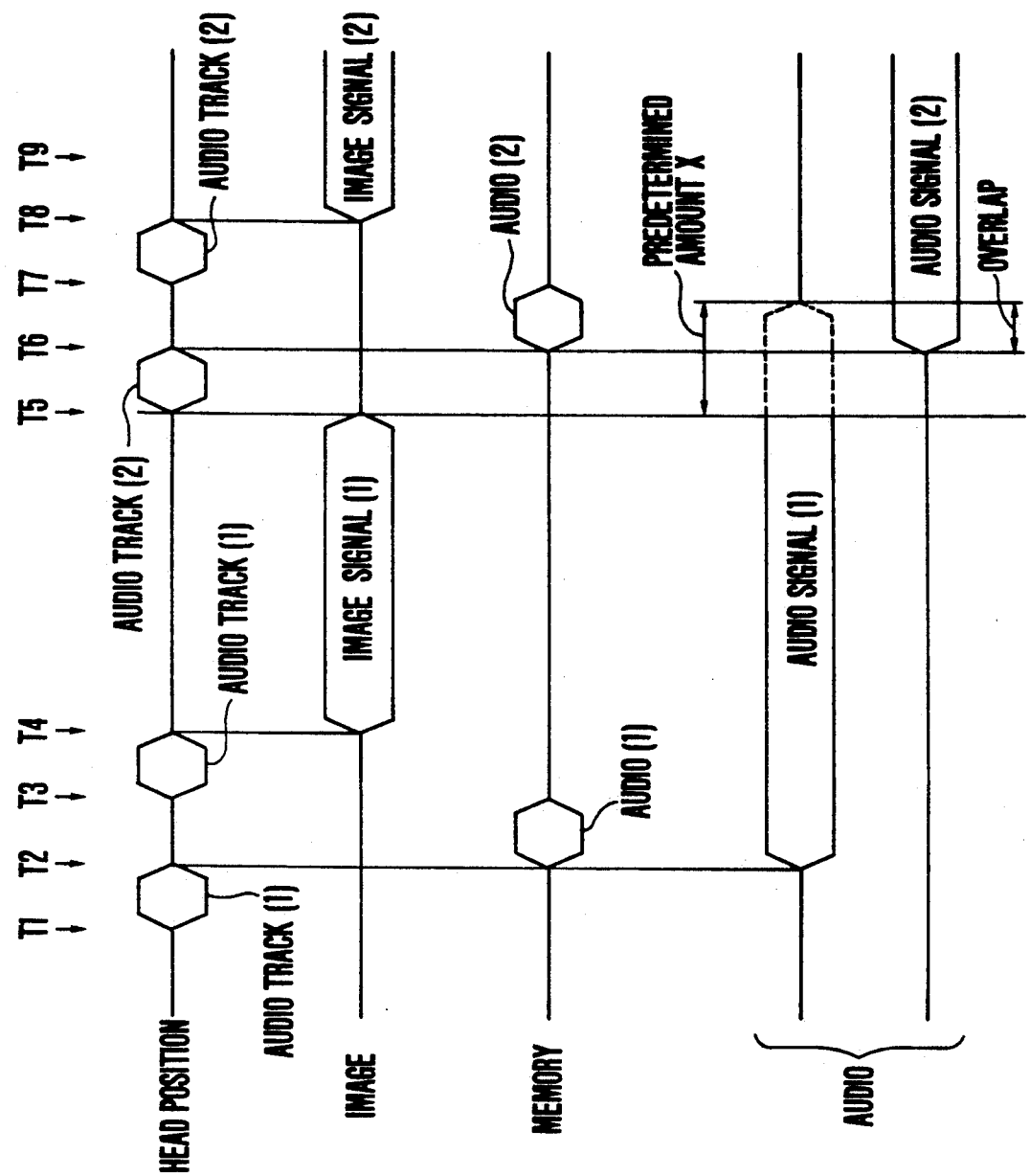
FIG. 7 is a timing chart illustrating a timing relation between a head movement and various signal data.

FIG. 7 is a timing chart which shows timings of the moving time of the head H, the writing and reading of the image signal and the audio signal into and out of the memory, etc.

Now it is assumed that an instruction for reproducing the image signal (1) is fed at the time T1, then the head moves to the position of the recording track of the audio signal (1) corresponding to the image signal (1) during the period from T1 to T2. During the period from T2 to T3, the audio signal data is read out and fed into the audio signal memory 9. At the same time, the audio signal data (1) stored in the audio signal memory 9 is fed out and subjected to the time-base extending processing by the audio signal input/output processing circuit 13, and then it is reproduced to form a reproduced audio signal output.

During the period from the time T3, when the reading of the audio signal from the video floppy has been effected, to the time T4, the head is moved to the position of the track of the image signal data (1) corresponding to the audio signal data (1) stored in the audio signal memory 9 and, thereafter, the image signal data (1) is displayed on the monitor at this position.

At the time T5, where the remaining amount of the audio signal data stored in the audio signal memory 9, namely the predetermined amount X from the end of the audio signal data exists, the head H starts its movement toward the position of the audio signal track which is to be next reproduced. As hereinbefore described, the audio signal track to be next reproduced is recorded in the control code in the present audio signal data. During the period from the time T6 to T7, the memory 9 receives the next audio signal data (2). At the same time, the audio signal is read out from the audio signal memory 9 and it is subjected to the time-base extending processing and the other processings to reproduce the audio signal.

In the case where the next audio signal data (2) is newly written into the audio signal memory 9 in which the audio signal data (1) has been previously stored, the end portion of the previously stored audio signal data area and the leading portion of the newly stored data area are stored in the audio signal memory 9 in overlapped state. Under the circumstances, the remaining amount of the audio signal data (1) stored in the audio signal memory becomes the predetermined amount X, as shown in FIG. 7, and the changeover operation is effected at the time when the next audio signal data (2) is read out and written into the audio signal memory 9, namely, at the time T6, where the data remains near the end of the audio signal data (1). Accordingly, no discontinuity of sound or other undesirable state can be produced at the time of the signal changeover operation. In other words, during the period when the signal changeover operation is being effected and the head is moving, namely, during the period T5-T6 and T7-T8, it is impossible to write the data from the head to the floppy, so that in this period the end portion of the audio signal stored in the audio signal memory 9, that is, the data, after the predetermined amount X of the stored data is reproduced and, consequently, even if the image signal is subjected to muting, the audio signal does not produce discontinuity during movement of the head.

In the above-mentioned apparatus, such case may happen that the audio signal produces a discontinuity at the time of reproduction or the image signal is not displayed.

More particularly, in the timing chart shown in FIG. 7, the head H starts writing the audio signal data (2) from the time T5 when the remaining amount of the audio signal data (1) on the memory 9 becomes less than the predetermined amount X, so that the head H moves during the time T5-T6 to the track on which the audio signal data (2) is recorded, and during the time T6-T7 the head reads in the audio signal data (2) and stores it into the memory 9. In this case, if the audio signal is a very short signal, it is detected simultaneously with the reading-in of the audio signal data that the remaining amount of the audio signal data is less than the predetermined amount, and the read-in operation changes to the next audio signal data (3), so that the head H moves to the audio signal track on which the audio signal data (3) is recorded. During the moving operation of the head, the audio signal data (2) should be read out and reproduced from the audio signal memory 9. However, if the audio signal data (2) has been completely read out before the head reads the audio data memory (3) into the memory, a discontinuity of sound would be caused. This is due to the fact that the length of the audio signal data is shorter than the time required to read the next audio signal data into the memory. The head moving time is different, depending upon the position of the track and, consequently, it is required by previously set the length of the audio signal data longer than the maximum time required to the head movement, at the time of the recording.

In the case where the audio signal data is extremely short, the head receives an instruction to read in the next signal data during the time the head is moving in order to read in the next audio signal. Accordingly, there is a danger that the head would move to effect the read-in of the next audio signal, without effecting the read-in of the image signal data.

The present invention is constructed to solve such problem and to stably provide a display of the image signal, without causing discontinuity in sound at any time.

That is, the present invention provides a system in which in the case where the audio signal data is recorded at the recording time, the sufficient length of time to prevent the malfunction as described above is assured, and in the case where the image signal and the audio signal are sequentially recorded the recording operation of the next image signal is prohibited until the recording time of the audio signal data has reached the predetermined time.

The construction will be described, with reference to a flow chart shown in FIG. 8.

The audio signal fed from the external audio signal source through the audio signal processing circuit 5 to the audio signal memory circuit 4 is subjected to sampling processing by the audio signal input/output processing circuit 13 and to the time-base compressing processing, etc., and the signal is sequentially fed into the audio signal memory 9 (STEP 1). Then the step proceeds to STEP 2, where it is decided whether an instruction for terminating the record has been fed or not. If the instruction for termination has been fed from the control circuit 6, the step proceeds to STEP 3, where the feeding of the audio signal is terminated and the audio signal data stored in the audio signal memory 9 in STEP 4 is recorded on the track of the video floppy.

While, if the instruction for termination has not been fed, the step proceeds to STEP 5, where it is decided whether a track feeding request has been fed from the control circuit 6 or not. If the track feeding request has been fed, the step proceeds to STEP 7, where the audio signal in the audio signal memory is recorded on the track and then the step proceeds to STEP 8, where the track feeding request is prohibited for a predetermined period. After this prohibiting period has lapsed, the step again proceeds to STEP 2 and the same operation is repeated.

If the track feeding request is not fed in the above-mentioned STEP 5, the step proceeds to STEP 6, where it is decided whether the amount of storage of the audio signal data stored in the audio signal memory 9 has reached the storing capacity of one track or not. If the amount of storage has reached the storing capacity of one track, the step proceeds to STEP 7 and the above operation is repeated thereafter. If the amount of storage has not reached the storing capacity of one track in said STEP 6, the step proceeds to STEP 9, where it is decided whether it is before the predetermined period for effecting the track feeding or not. If it is within the predetermined period before the track feeding, the step proceeds to STEP 10, where a warning signal is displayed on the display means 7. It is, of course, possible to display the warning signal on an image monitor (not shown). If it is not within the predetermined period before the track feeding, the step returns to the STEP 2, without passing STEP 10. The above operation is repeated thereafter.

By prohibiting the track feeding request for the predetermined period after recording the audio signal data in the audio signal memory 9 onto the track, as described above, it is possible to prevent the reproduction where the actual reproducing time of the audio signal read into the audio signal memory 9 is shorter than the image muting period during which the head changes over the track, thereby preventing a discontinuity in sound.

Even where the track feeding request is not fed, the fact that the predetermined period before the track feeding, that is, the track feed will be effected before long is decided (STEP 9) the fact that the track feeding is effected in near future is displayed (STEP 10), thereby providing a warning to a user. It is desirable for the user to terminate his recording operation, with reference to the said warning signal, and a discontinuity in sound owing to the fact that the audio signal track is longer than the image track since the image is subjected to muting during the track changeover operation is prevented.

Accordingly, it is desirable that the user, who is effecting the recording of the audio signal, continues his audio signal recording operation, when a display for prohibiting the track feeding is issued, thereby indicating the fact that the amount of recording of the audio signal is insufficient in one track, and terminates his recording operation, with reference to the display made in the STEP 10 to indicate that the track changeover will be effected in the near future. Thus, it is possible to effect a smooth reproducing operation, which does not produce a discontinuity in the reproduced sound.

According to the above-described embodiment of the present invention, receiving of the track moving request is prohibited for a predetermined period after the track moving operation, so that occurrence of discontinuous reproduction of a continuous sound is prevented, even if an image corresponding to the sound is changed over at any desired timing.

Furthermore, a warning signal indicating the fact that the receiving of the track changeover request is prohibited is displayed and thus an indication is given to the user to indicate the continuation of the operation of recording the audio signal data.

Since a warning signal indicates a presence of a track changeover a predetermined period before effecting the track changeover operation, it can indicate to the user the timing of the track changeover operation and suggest the timing of ending the audio signal recording on the corresponding track.

Thus, the present invention provides a still image recording and/or reproducing apparatus which enables recording and/or reproducing an audio signal, in which occurrence of a discontinuity in sound at the time of reproduction is effectively prevented, that provides a great advantage in the art.

According to another embodiment of the invention, there is provided an apparatus in which a timing of changing access position of the reproducing means is controlled, depending upon a result of comparison of the above-mentioned moving distance and the remaining amount of the audio signal during reading out the same from the memory, whereby occurrence of discontinuity of the audio signal during reproduction is prevented.

This embodiment will be explained, with reference to FIG. 9(a) and FIG. 9(b).

Figure 9A:
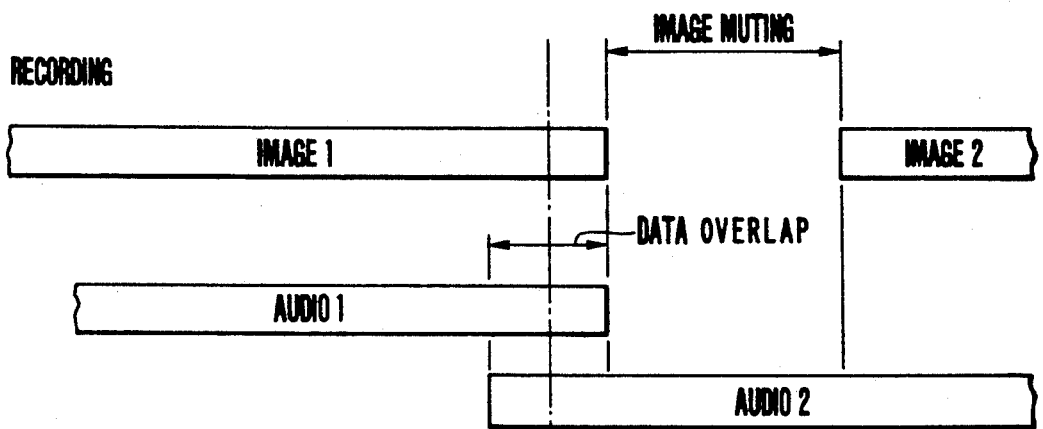
FIG. 9(a) and FIG. 9(b) illustrate timings of a signal at the time of recording and at the time of reproducing, respectively.
Figure 9B:
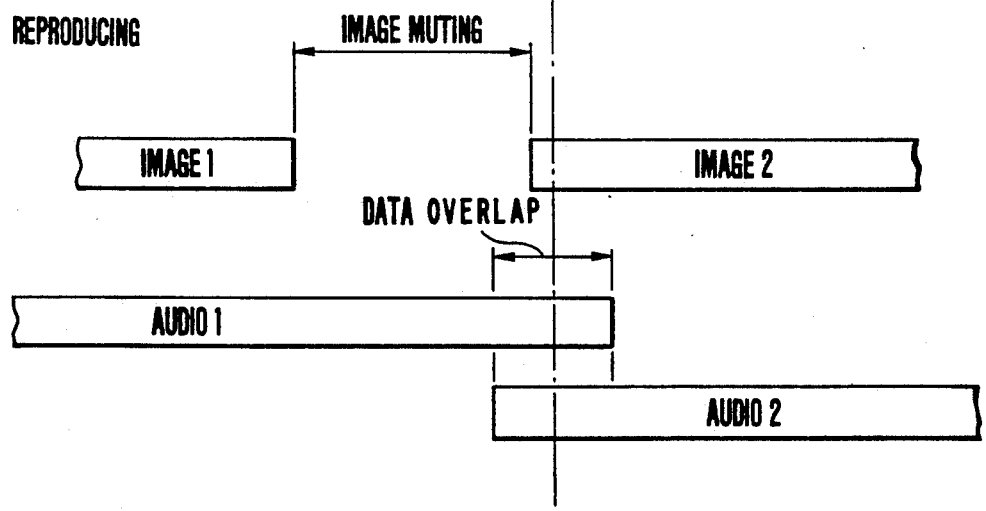

FIG. 9(a) shows a timing of recording in so-called postrecording mode in which a plurality of image signals are previously recorded on a video floppy and a plurality of audio signals corresponding to said image signals are recorded on said video floppy. FIG. 9(b) shows a timing of reproducing effected from the video floppy on which the above image signals and audio signals are recorded.

In FIG. 9(a) which shows the recording, an audio signal 1 and an audio signal 2 actually form a continuous audio signal but they are separately shown in FIG. 9(a), for the purpose of showing the fact that their recording tracks are different from each other. An image 1 and an image 2 indicate times when still images recorded on the video floppy are directly reproduced from the video floppy and displayed on a monitor, respectively. During an image muting term existing between the displaying times of the image 1 and the image 2, the head is moved from the track on which the image signal 1 is recorded to the track on which the audio signal 1 is recorded, and after recording the audio signal the head is moved to the track on which the image signal 2 is recorded, while the output fed to the monitor is subjected to muting in order to prevent a turbulent picture from being displayed on the monitor. The reproducing as shown in FIG. 9(b) is essentially same as the recording as shown in FIG. 9(a), except the operation of reproducing the audio signal from the video floppy. A problem encountered in the process of recording and reproducing the continuous audio signal resides in the fact that there is a difference in timing appearing in the track moving and accessing time which is indicated in FIG. 9 as the image muting time. The difference in timing may result in causing a discontinuity of the audio signal at the time of reproducing the same which audio signal could be continuously recorded at the time of recording. Now, an embodiment in which such defect is avoided will be explained.

Figure 10A:
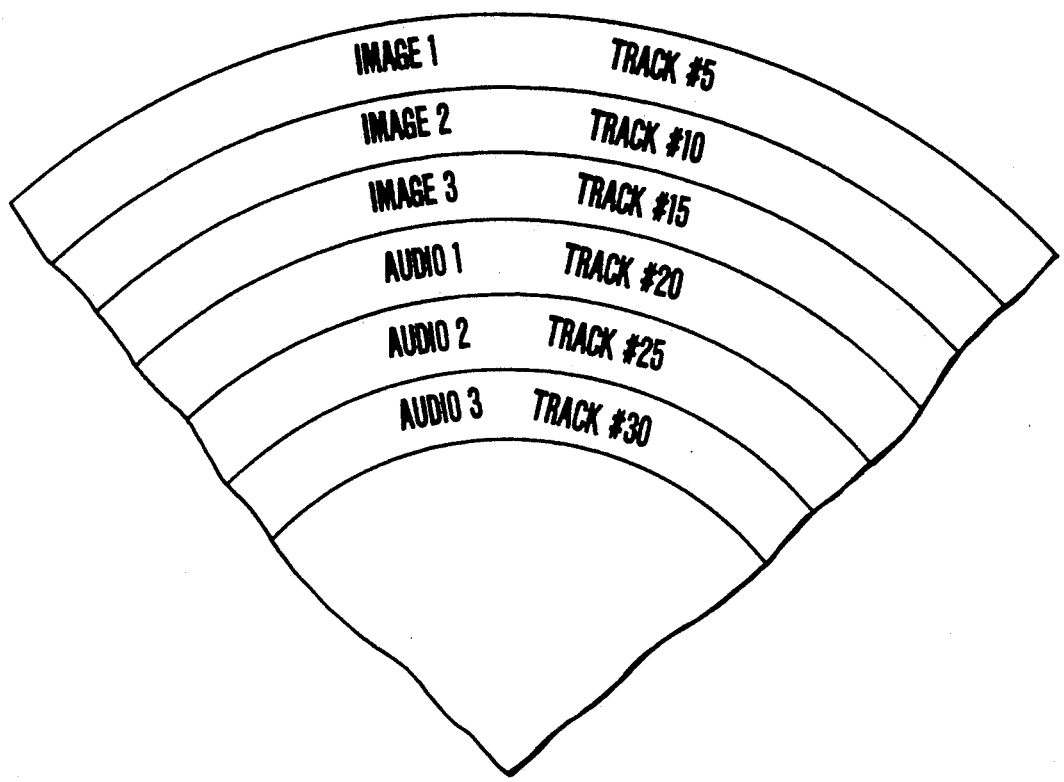
FIG. 10(a) and FIG. 10(b) show an example of recording of a signal on a video floppy disk.
Figure 10B:
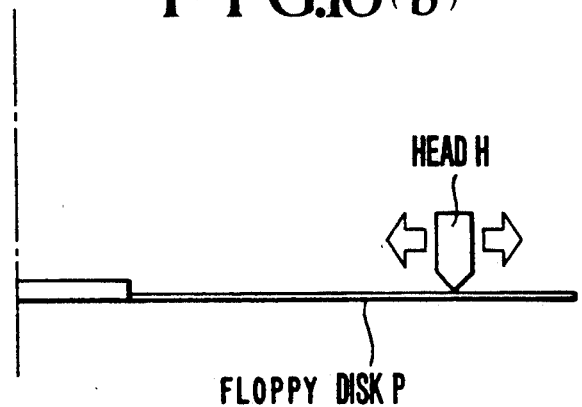
Figure 11A:
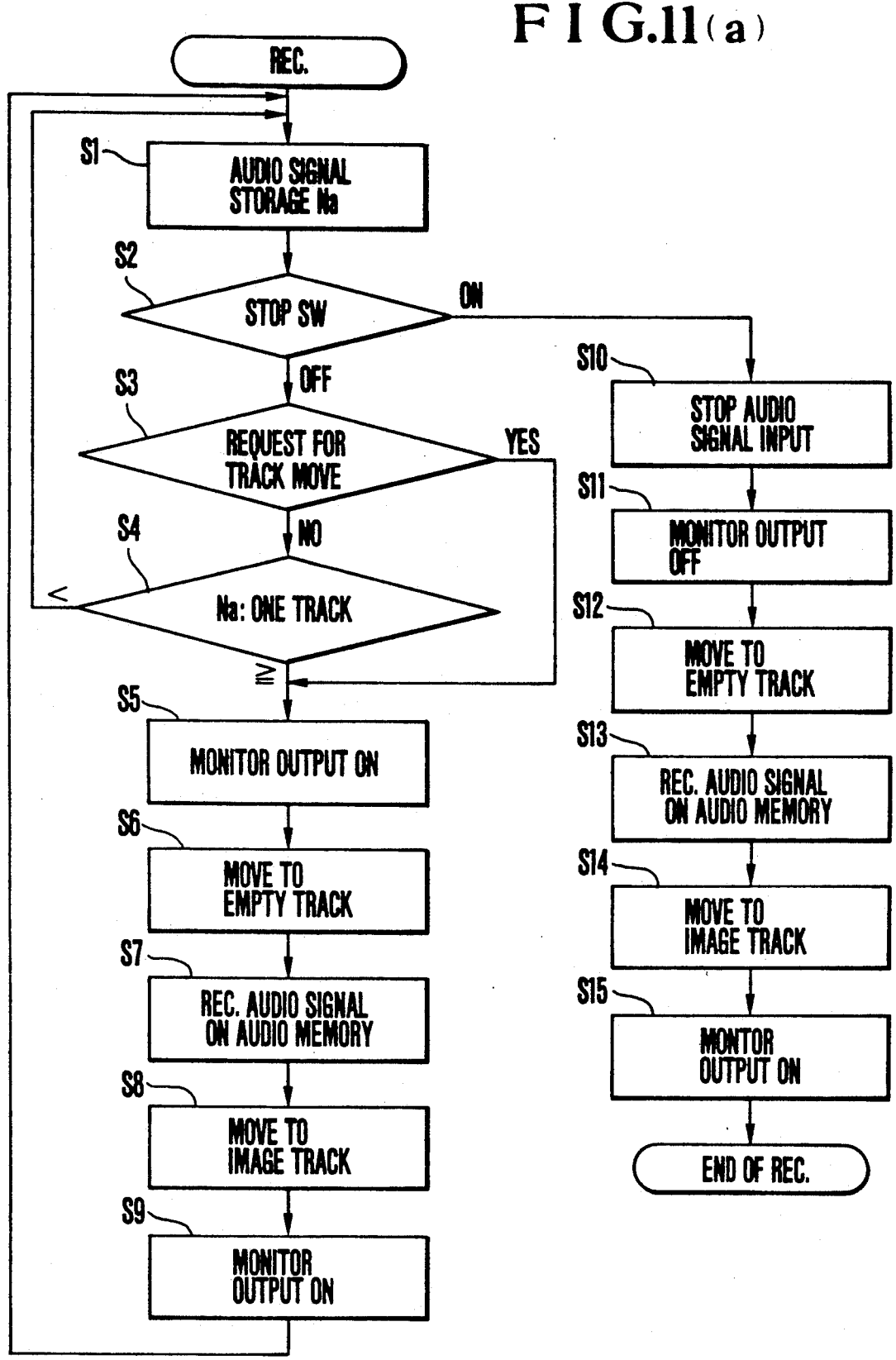
FIG. 11(a) and FIG. 11(b) are flow charts illustrating recording and reproducing operations of the apparatus.

FIG. 10(a) is a plan view showing the status of recording on a video floppy P which is to be recorded and reproduced by the above-mentioned device, and FIG. 10(b) is a diagram showing a relation between the video floppy and a head H which is moved on the video floppy to effect the recording and/or reproducing operation. In this embodiment, the construction of a hardware of the apparatus is essentially same as that shown in FIGS. 1-3, and the detailed description thereof is omitted. Firstly, the audio signal recording operation will be explained, with reference to a flow chart shown in FIG. 11(a). When a request for starting the audio signal recording is fed to the control circuit 6, an instruction is given to the audio signal processing circuit 5 to take up the audio signal fed thereto. The FDC 3 is driven and a first still image corresponding to the audio signal is displayed through the image signal processing circuit 1 onto the monitor 2. The audio signal memory 4 constantly monitors the amount of storage of the audio signal and when the amount reaches the maximum amount recordable in one track, an information is given to the control circuit 6 to such effect (STEP 1-STEP 4). The control circuit 6 feeds instructions to the image signal processing circuit 1 to effect muting of the output to the monitor (STEP 5), to the FDC 3 to move the head to the track for audio signal recording (STEP 6), and to record the audio signal stored in the audio signal memory 4 onto the video floppy. When the recording of the audio signal has completed, the head is moved to the position of the track on which the nextly displayed still image is recorded (STEP 8), and at the time when the still image becomes reproducible an instruction for canceling the muting of the monitor output is fed to the image signal processing circuit 1 (STEP 9). During this time, the audio signal memory 4 continuously stores the audio signal. If a request for changeover of the still image is fed to the control circuit 6 from the switch group 7 before the audio signal of the amount corresponding to one track has been stored in the audio signal memory 4, the control circuit 6 acts to record the audio signal, which has been thus far stored in the audio signal memory 4, onto the video floppy. The above operation is repeated, until a request for terminating the recording is fed from the switch group 7 to the control circuit 6 or there becomes no empty track on the video floppy on which the audio signal can be recorded. However, the recording operation is not effected if there is no recordable empty track at the time of starting the audio signal recording operation or the number of the track to be recorded is not previously indicated.

Figure 11B:
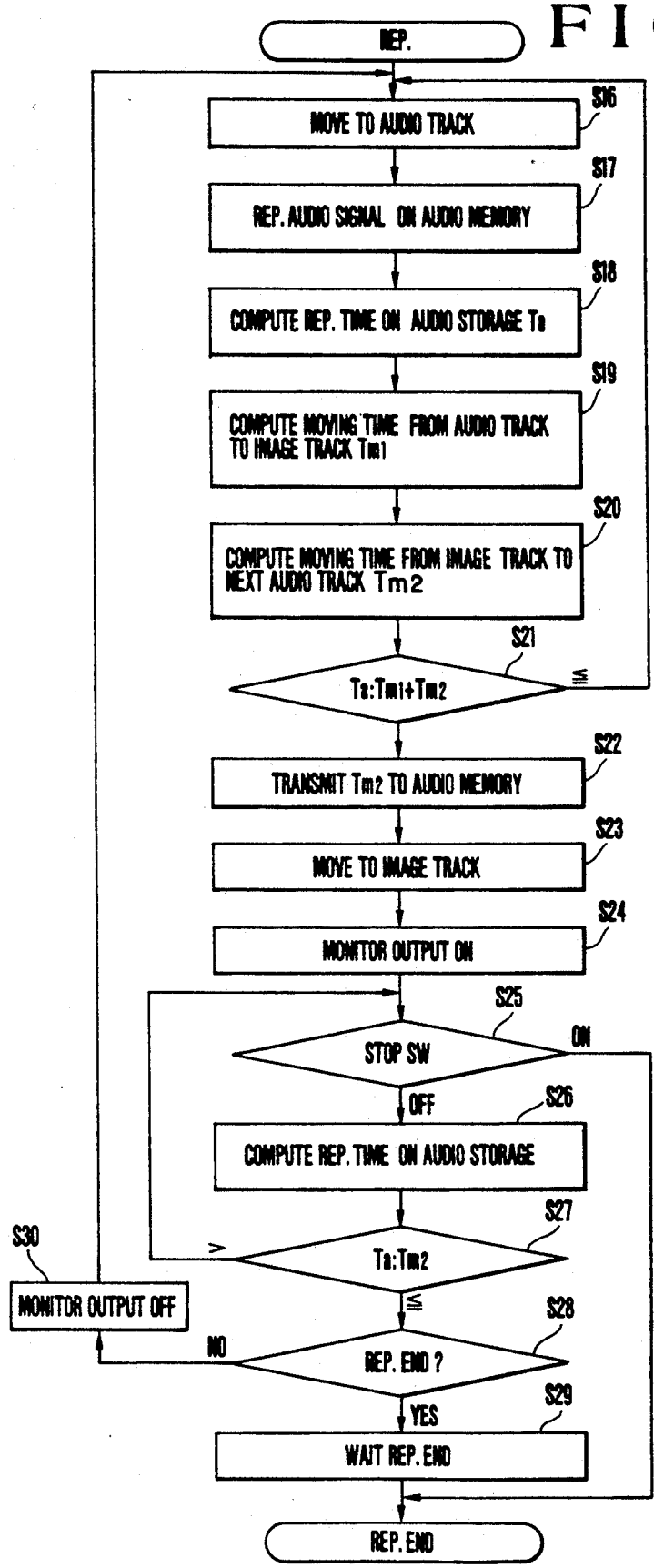

Nextly the operation of reproducing the recorded audio signal from the video floppy on which the audio signal has been recorded as described above will be explained, with reference to a flow chart shown in FIG. 11(b). When a request for reproducing the audio signal is fed from the switch group 7 to the control circuit 6, said control circuit feeds an instruction to the image signal processing circuit 1 to effect muting of the monitor output and drives the head through FDC 3 (STEP 16). The audio signal is reproduced from the track, on which the leading end of the audio signal has been recorded, onto the audio signal memory 4 (STEP 17). At this stage, the track number on which is recorded the still image corresponding to the reproduced audio signal, which has been recorded with the audio signal, and the track number on which is recorded the audio signal succeeding the above-mentioned audio signal are read out and transmitted to the control circuit 6. The control circuit 6 serves to obtain the sum of a number of tracks moved from the track now under access to the track on which the corresponding still image signal is recorded and a number of tracks moved from the track on which said still image signal is recorded to the track on which the succeeding audio signal is recorded, obtain the product of said sum of the moved track numbers and a previously set moving time of one track and compare the same with the audio signal reproducing time remaining on the audio signal memory 3 at present (STEP 18–STEP 21). At the same time, the product of the number of tracks moved from the still image track to the track on which the succeeding audio signal is recorded and the moving time of one track is obtained, and the result is transmitted to the audio signal memory 4 as the track movement time (STEP 22). If it is found by the above comparison that the reproducing time of the audio signal stored in the audio signal memory 4 is longer than the track moving time, the movement to the corresponding still image track is effected (STEP 23), and if it is found that the former is shorter than the latter, the movement directly to the track on which the succeeding audio signal is effected (STEP 16) and the recorded audio signal is reproduced on the audio signal memory 4, whereby the above-mentioned comparison is executed. Then, at the time when the still image becomes reproducible, the muting of the monitor output is canceled (STEP 24), and if the audio signal reproducing operation is not started, an instruction for starting the reproducing operation is given to the audio signal processing circuit 5, whereby the audio signal stored in the audio signal memory 4 is read out and a sound is reproduced. The audio signal memory 4 serves to constantly monitor the amount of the stored audio signal (STEP 26), and repeat the operation of comparing the track moving time received from the control circuit 6 at the time when the audio signal has been reproduced from the video floppy to the audio signal memory 4 with the audio signal reproducing time remaining in the audio signal memory (STEP 25–STEP 27). At the time when the track moving time becomes longer, a request for track movement is given to the control circuit 6, and said control circuit 6 executes the operation of reproducing the succeeding audio signals, according to the process as described above. The above operation is repeated until a flag indicating the termination is detected on the track on which the audio signal is recorded (STEP 28).

According to the embodiment as described above, at the time when the track on which the audio signal is recorded is accessed, the time required to move to the image track to be next accessed and the track on which succeeding audio signal is recorded is compared with the reproducing time of the audio signal stored in the audio signal memory, and, during displaying the still image recorded on the image signal track, it is constantly compared with the reproducing time of the recorded audio signal of the succeeding sound. Thus, such unfavorable operation that a discontinuity in sound occurs during reproduction of an audio signal is avoided.

In the above description, the present invention was explained with reference to the embodiment in which use is made of the video floppy. It will be clear, however, that the present invention is not limited to the use of the video floppy and a tape-shaped recording medium or a solid memory, such as a semiconductor memory may be used.

According to the above-described embodiments an audio signal divided and recorded on a plurality of areas of a recording medium can be reproduced without causing a discontinuity in a reproduced sound.

What is claimed is:

1. A reproducing apparatus for reproducing from a recording medium an audio signal which is compressed on time base, divided and recorded on a plurality of positions on said recording medium together with a video signal to which said audio signal corresponds, said apparatus being adapted for uninterrupted reproduction of said audio signal and comprising:

(a) reproducing means for producing said audio signal and said video signal from said recording medium, said reproducing means being movable to change an access position thereof relative to said recording medium;

(b) a memory for temporary storage of the audio signal reproduced by said reproducing means, in order to effect time base change and for readout of said audio signal; and (c) control means for controlling change of said access position of said reproducing means between positions on said recording medium at which audio signals are recorded and positions at which video signals are recorded, depending upon a time for readout of a remaining amount of the audio signal which has been stored in said memory, a time required for said reproducing means to move from a present audio recording position to a succeeding audio recording position and a time required for said reproducing means to move from said present audio recording position to a video recording position having recording therein said video signal to which said audio signal corresponds.

2. A reproducing apparatus according to claim 1, wherein said reproducing means includes:
(1) a reproducing head; and
(2) means for moving said head to change the position of said head relative to said recording medium.

3. A reproducing apparatus according to claim 1, wherein said control means controls change of said access position of said reproducing means between positions on said recording medium at which audio signals are recorded and positions at which video signals are recorded, depending upon a result of a comparison of said time for readout of a remaining amount of the audio signal which has been stored in said memory with the sum of said time required for said reproducing means to move from a present audio recording position to a succeeding audio recording position and said time required for said reproducing means to move from said present audio recording position to a video recording position having recorded therein said video signal to which said audio signal corresponds.

4. A reproducing apparatus according to claim 1, further comprising:
(d) reading means for sequentially reading out audio signals stored in said memory; and
(e) feeding means for feeding the signals read out by said reading means to a speaker which reproduces and audible sound.

5. A reproducing apparatus according to claim 1, wherein said recording medium is a disk-shaped recording medium.

6. A reproducing apparatus according to claim 1, wherein said audio signal is divided and recorded at random positions at the time of dividing and recording said signal into said plurality of positions on said recording medium.

7. A reproducing apparatus comprising:
(a) reproducing means for producing an audio signal which is compressed on time base, divided and recorded on a plurality of positions on a recording medium, said reproducing means being movable to change an access position thereof relative to said recording medium from a given position on which a portion of said audio signal is recorded to a further position on which a further portion of said audio signal is recorded;
(b) a memory for temporary storage of the audio signal reproduced by said reproducing means, in order to effect time base change; and
(c) control means for selectively controlling change of said access position of said reproducing means from said given position to said further position, depending upon at least a time for reading out a remaining amount of the audio signal which has been stored in said memory and a time required for said reproducing means to move a distance corresponding to a distance between said given position and said further position.

8. A reproducing apparatus according to claim 7, wherein said reproducing means includes:
(1) a reproducing head; and
(2) means for moving said head to change the position of said head relative to said recording medium.

9. A reproducing apparatus according to claim 7, wherein said control means controls change of said access position of said reproducing means between positions on said recording medium at which audio signals are recorded and positions at which video signals are recorded, depending upon a result of a comparison of said time for readout of a remaining amount of the audio signal which has been stored in said memory with at least of said time required for said reproducing means to move a distance corresponding to a distance between said given position and said further position.

10. A reproducing apparatus according to claim 7, further comprising:
(d) reading means for sequentially reading out audio signals stored in said memory; and
(e) feeding means for feeding the signals read out by said reading means to a speaker which reproduces and audible sound.

11. A reproducing apparatus according to claim 7, wherein said recording medium is a disk-shaped recording medium.

12. A reproducing apparatus according to claim 7, wherein said audio signal is divided and recorded at random positions at the time of dividing and recording said signal into said plurality of positions on said recording medium.

* * * * *

UNITED STATES PATENT AND TRADEMARK OFFICE
CERTIFICATE OF CORRECTION

PATENT NO. : 5,185,682

DATED : February 9, 1993

INVENTOR(S) : Hirokazu Takahashi, et al.

It is certified that error appears in the above-identified patent and that said Letters Patent is hereby corrected as shown below:

| | |
|---|---|
| Col. 1, line 10 | After "Invention" insert -- , The present invention relates to a recording -- |
| Col. 1, line 61 | After "above" insert -- , -- |
| Col. 1, line 65 | After "in" insert -- a -- |
| Col. 2, line 2 | After "in" insert -- a -- |
| Col. 2, line 15 | Change "with" to -- within -- |
| Col. 2, line 68 | Delete "," first occurrence |
| Col. 3, line 67 | Delete "extending the signal processing circuit 5" |
| Col. 6, line 11 | Delete "when" |
| Col. 7, line 36 | Delete "," third occurrence |
| Col. 7, line 37 | After "data" insert "," |
| Col. 8, line 2 | Change "by" to -- to -- |
| Col. 8, line 4 | Change "to" to -- by -- |
| Col. 8, line 14 | Change "problem" to -- problems -- |
| Col. 10, line 30 | After "essentially" insert -- the -- |
| Col. 11, line 3 | Change "nextly" to -- next -- |

UNITED STATES PATENT AND TRADEMARK OFFICE
CERTIFICATE OF CORRECTION

PATENT NO. : 5,185,682

DATED : February 9, 1993

INVENTOR(S) : Hirokazu Takahashi, et al.

It is certified that error appears in the above-identified patent and that said Letters Patent is hereby corrected as shown below:

Col. 11, line 25    Change "Nextly" to -- Next --

Col. 13, line 36    Change "and" to -- an

Col. 14, line 31    Delete "of"

Col. 14, line 40    Change "and" to -- an --

Signed and Sealed this

Thirtieth Day of November, 1993

Attest:

BRUCE LEHMAN

Attesting Officer    Commissioner of Patents and Trademarks